Figure 1:
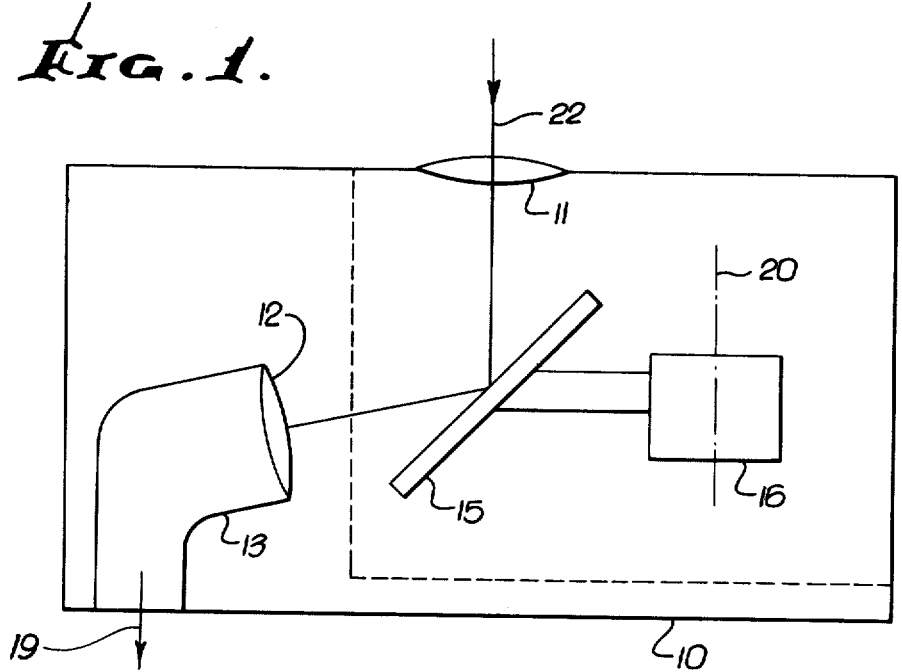

United States Patent
Parker

[19]

[11] 3,881,803
[45] May 6, 1975

[54] STABILIZED OPTICAL VIEWING DEVICE
[76] Inventor: Guy Malcolm Parker, 57 Old Rd., Headington, Oxford, OX 3 7 JZ, England
[22] Filed: May 22, 1973
[21] Appl. No.: 362,799

[30] Foreign Application Priority Data
May 25, 1972 United Kingdom............... 24561/72

[52] U.S. Cl. .................. 350/16; 356/149; 356/248
[51] Int. Cl. ........................................ G02b 23/02
[58] Field of Search .............. 350/16; 356/248, 149

[56] References Cited
UNITED STATES PATENTS
| | | | |
|---|---|---|---|
| 1,709,314 | 4/1929 | Henderson | 356/248 |
| 3,468,595 | 9/1969 | Humphrey | 350/16 |
| 3,479,108 | 11/1969 | Humphrey | 350/16 |
| 3,711,178 | 1/1973 | Humphrey | 350/16 |

Primary Examiner—David H. Rubin
Attorney, Agent, or Firm—William W. Haefliger

[57] ABSTRACT

An optical viewing device having a stabilized mirror in the objective lens system, the arrangement being such that the conditions for stabilization of the image against vibration about an axis perpendicular to the line of sight of the device is $$1 - \frac{2}{r} - \frac{2s}{fr} - \frac{1}{m}$$

where
r is a coupling ratio;
s is the distance along the optical axis between the mirror and a part of the objective lens system that lies in front of the reflecting surface;
f is the focal length of that part of the objective lens system that lies in front of the replecting surface; and
m is the overall magnification of the complete optical system of the device.

9 Claims, 2 Drawing Figures

STABILIZED OPTICAL VIEWING DEVICE

This invention relates to optical viewing devices.

It is well known that hand held optical viewing devices such as binoculars or telescopes are limited in useful magnification because of movement of the image due to hand tremor or vibration which is magnified to the same extent.

The vibration can be considered to have two components:
a. linear tremor transverse to the line of sight.
b. angular tremor about horizontal and vertical axes transverse to the line of sight.

The linear tremor component is of little practical importance and it is an object of the present invention to obviate or mitigate the effects of the angular tremor.

The present invention is an optical viewing device comprising an objective lens system having two spaced parts and a line of sight, a body having an axis which tends to align itself substantially parallel to the line of sight, an inner gimbal supporting said body and being itself supported in an outer gimbal, a reflecting surface located in the optical path through the device between the parts of the objective lens system and pivotally mounted on the outer gimbal, and a link between the reflecting surface and the inner gimbal such that their respective angular movements relative to the outer gimbal are in the ratio $1:r$, the arrangement being such that $$1 - \frac{2}{r} + \frac{2s}{fr} = \frac{1}{m}$$

where
$s$ is the distance along the optical axis between the reflecting surface and that part of the objective lens system that lies in front of the reflecting surface;
$f$ is the focal length of that part of the objective lens system that lies in front of the reflecting surface; and
$m$ is the overall magnification of the complete optical system of the device;
whereby the image produced by the device is stabilised against vibration of the device about an axis perpendicular to the line of sight.

The present invention is also an optical viewing device comprising an objective lens system having two spaced parts and a line of sight, a body having an axis which tends to align itself substantially parallel to the line of sight, an inner gimbal supporting said body and being itself supported in an outer gimbal, a reflecting surface located in the optical path through the device between the parts of the objective lens system and pivotally mounted on the outer gimbal, the arrangement being such that $$\frac{s}{f} + \left(1 - \frac{s}{f}\right)\left\{2\sin\frac{\delta}{2} \sigma\left[\genfrac{}{}{0pt}{}{\sin}{\cos}\left(\frac{\delta}{2}-\sigma\right) - \tan\sigma\sin\left(\frac{\delta}{2}-\sigma\right)\right] + \cos\delta\right\} = \frac{1}{m}$$

where
$s$ is the distance along the optical axis between the reflecting surface and that part of the objective lens system that lies in front of the reflecting surface;
$f$ is the focal length of that part of the objective lens system that lies in front of the reflecting surface;
$m$ is the overall magnification of the complete optical system of the device;
$\delta$ is the deviation from a straight line of the optical axis by the reflecting surface with the gimbals in their undeflected positions; and
$\sigma$ is the angle of the axis of the outer gimbal relative to an axis perpendicular to the inner gimbal axis and to the optical axis in front of the reflecting surface with the gimbals undeflected
whereby the image produced by the device is stabilised against vibration leading to angular movement of the device about an axis perpendicular to the line of sight.

Figure 2:
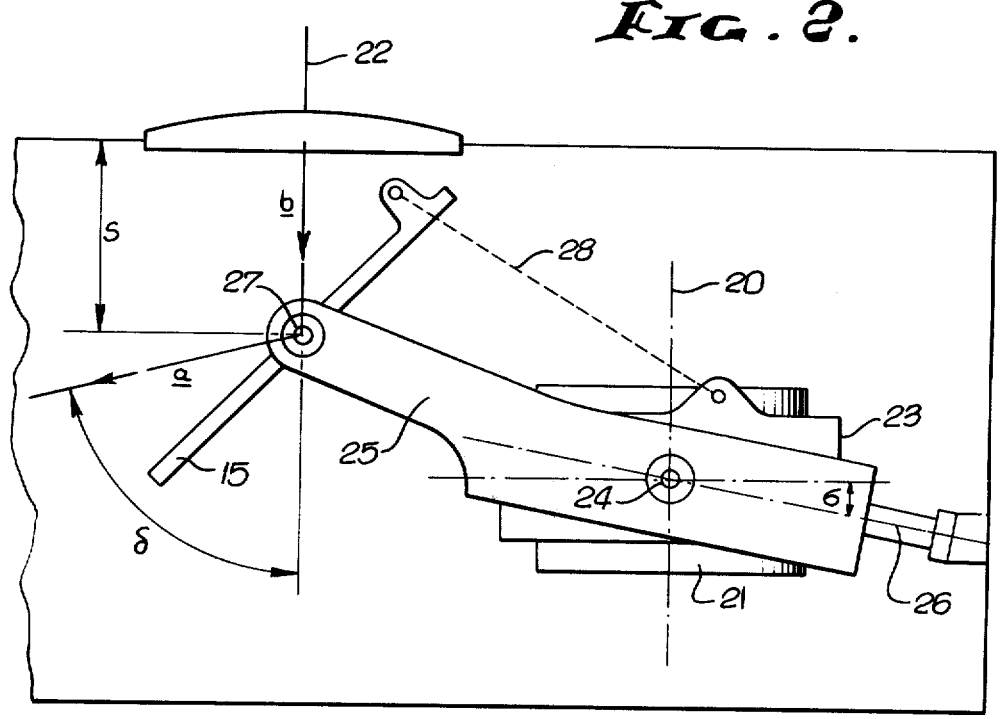

Embodiments of the present invention will now be described, by way of example, with reference to the accompanying drawing in which:

FIG. 1 is a diagrammatic plan view of an optical viewing device according to the present invention; and FIG. 2 shows the details of a gyroscopically mounted mirror used in the embodiment of FIG. 1.

Considering now FIG. 1, an optical viewing device 10 consists of an objective lens system comprising two spaced lenses 11 and 12, an eye-piece lens system 13 and a reflecting surface, in this embodiment mirror 15, controlled by a gyroscope 16 and located in the optical path of the device 10 between the lenses 11 and 12. It should be understood that the lenses 11 and 12 may be compound lenses and that the eye-piece lens system 13, the details of which are irrelevant to the present invention, may include optical components for alignment, beamsplitting and the like and is viewed from behind the instrument.

Moreover in certain circumstances, as will be discussed, either lens 11 or 12 may be omitted, i.e., replaced by a notional lens of infinite focal length.

Referring now to FIG. 2, the line of sight 22 represents the optical axis when the gimbals are undeflected and the undeflected spin axis 20 of the gyroscope rotor 21 is parallel to the line of sight 22 and to the viewing direction 19 of the optical device 10. The rotor 21 is mounted in an inner gimbal 23 which in turn is mounted about an axis 24 perpendicular to the line of sight in an outer gimbal 25. The outer gimbal 25 is mounted in the frame of the device 10 about an axis 26 which lies in a plane containing the axis 20 and perpendicular to axis 24 and is inclined at a small angle to the axis orthogonal to axes 20 and 24. The outer gimbal 25 supports the mirror 15 about an axis 27 parallel to the axis 24. A mechanical link 28 interconnects the mirror 15 and the inner gimbal 23 so that their angular movements relative to the outer gimbal 25 are related.

Operation of the device of FIGS. 1 and 2 will now be considered, the following symbols being used in the analysis:
$s$ the distance along the optical axis between the mirror 15 and the second principal plane of the lens 11, i.e., that part of the lens system that lies in front of the mirror 15;
$\delta$ is the deviation from a straight line of the optical axis by the reflecting surface with the gimbals in their undeflected positions;
$\sigma$ the skew angle of the axis 26;

$\Delta\theta$ a small deflection of the device about a vertical axis, i.e., a small yaw;

$\Delta\phi$ a small deflection of the device about a horizontal axis, i.e., a small tilt;

$m$ the linear magnification of the complete optical system;

$r$ the ratio of angular movement with respect to gimbal 25 of the inner gimbal 23 to that of mirror 15 due to the coupling link 28; and $f$ is the focal length of the lens 11.

Consider firstly a small displacement $\Delta\theta$ of the case in a horizontal plane. Since the inner gimbal 23 is held stationary by the rotor 21, the mirror 15 turns through an angle $-\Delta\theta/r$ relative to the frame of the device.

The optical axis $b$ between the lens 11 and the mirror 15 thus rotates $-2\Delta\theta/r$ relative to the case and consequently $\left(\Delta\theta - 2\Delta\theta/r\right)$ or $\Delta\theta\left(1 - 2/r\right)$ relative to its original direction.

This displacement of the optical axis from the centre of the lens 11 is $$\frac{-2\Delta\theta s}{r}$$

and this causes an additional deflection of the optical axis in passing through the lens 11 of $$-\frac{1}{f}\left(\frac{-2.\Delta\theta.s}{r}\right)$$

or $$\frac{2.\Delta\theta.s}{f.r}$$

The net deflection of the optical axis in the region in front of lens 11 from its original direction is thus $$\Delta\theta\left(1 - \frac{2}{r}\right) + \frac{2.\Delta\theta.s}{f.r}$$

From this it follows the condition for stabilisation in the horizontal plane is $$1 - \frac{2}{r} + \frac{2s}{fr} = \frac{1}{m} \quad (1)$$

Consider now a displacement of the case $\Delta\phi$ in the vertical plane, i.e., tilt. The deflection of the optical axis outside the lens 11 (i.e., the sight line) due to this tilt is made up of three parts:

a. that due to movement of the outer gimbal 25 caused by the skew angle $\sigma$;
b. that due to $\delta$ not being a right angle; and
c. that due to displacement of the optical axis from the centre of the lens 11.

Taking the first part and considering for the moment that the axis at $a$ i.e., the optical path after the mirror 15, is fixed and consider only the vertical deflection of the axis at $b$ due to $\sigma$. This can be shown to be $$2\Delta\phi\sin\frac{\delta}{2}\sin\sigma\left[\cos\left(\frac{\delta}{2}-\sigma\right)-\tan\sigma\sin\left(\frac{\delta}{2}-\sigma\right)\right] \quad (2)$$

To find the second part, consider the mirror 15 to be fixed in space, and for convenience in analysis without loss of generality consider the tilt axis to pass through the mirror pivot axis.

The tilt $\Delta\phi$ caused a lowering (i.e., below the paper) of the optical axis $a$ by an angle $$\Delta\phi.\sin(90°-\delta)$$

or $$\Delta\phi.\cos\delta \quad (3)$$

the optical axis $b$ rises by an equal angle and the vertical displacement of $b$ from its original direction is the sum of (3) and (2) for convenience written (2) + (3).

To find the third part consider that the tilt axis passes through the mirror point of reflection; the displacement of the lens 11 from its original position is then $\Delta\phi.s$.

The optic axis is thru displaced below the centre of the lens 11 by a net distance $\Delta\phi.s - s[(2)+(3)]$ which results as before in a deflection of the optic axis in traversing the lens 11 of amount $$\frac{\Delta\phi s - s[(2)+(3)]}{f} \quad (4)$$

The overall deflection of the sight line is (2) + (3) + (4) i.e., $$(2)+(3)+\frac{s}{f}[\Delta\phi-(2)-(3)]$$

For correct stabilisation in this plane this must be equal to $\Delta\phi/m$, and we finally obtain:

$$\frac{s}{f} + \left(1-\frac{s}{f}\right)\left\{2\sin\frac{\delta}{2}\sin\sigma\left[\cos\left(\frac{\delta}{2}-\sigma\right)-\tan\sigma\sin\left(\frac{\delta}{2}-\sigma\right)\right]+\cos\delta\right\} = \frac{1}{m} \quad (5)$$

Equations (1) and (5) together are the necessary and sufficient conditions for complete space stabilisation of the final image.

The embodiment described may be modified by substituting for the gyroscope rotor any other body which tends to maintain its alignment in space, such as, for example, an inertial mass.

SPECIAL CASES

Case 1

$$f = \infty \quad \delta = 90°$$

(1) and (5) reduce to:

$$1 - \frac{2}{r} = \frac{1}{m} \quad \text{or } R = \frac{2m}{m-1}$$

and $$\sqrt{2}\sin\sigma[\cos(45°-\sigma)-\tan\sigma\sin(45°-\sigma)] = \frac{1}{m}$$

with solutions:

| $\sigma°$ | 4 | 5 | 6 | 7 |
|---|---|---|---|---|
| m | 14.4 | 11.4 | 9.5 | 8.1 |

Case 2

$$f = \infty \quad \sigma = 0$$

(1) and (5) reduce to:

$$r = \frac{2m}{m-1} \text{ and } \cos\delta = \frac{1}{m}$$

Case 3

$$\delta = 90° \quad \sigma = 0$$

(5) reduces to:

$$\frac{s}{f} = \frac{1}{m}$$

and thus (1) becomes $$r = 2$$

For low values of $m$ this could allow the lens 12 to be dispensed with, but for usual $m$-values and practical spacings '$s$', $f$ becomes too long to make this feasible. There is another practical difficulty discussed below.

It is highly desirable to have most of the lens power behind the mirror rather than in front of it, if the system is intended to have any slewing ability, since the spin axis then lags behind the sight line, and the optic axis passes through the lens 11 at the lag angle (to a close approximation) of up to about 7°, needing a lens corrected for this conditions.

On the other hand the lens 11 can without penalty be a very weak simple lens if it is considered that lenses are cheaper to make than flat windows of the quality needed.

Case 3 is thus regarded as not in general a good choice.

Case 1 has the disadvantage that even in the central condition, shake of the case about a horizontal axis will require a certain angular motion of the outer gimbal, the acceleration of the gimbal causing a reaction torque on the gyro spin axis.

Of course, gimbal inertia must always couple case vibration to the spin axis, even when $\sigma = 0$, if the spin axis is deflected from centre, which it usually is; however, it seems wise to keep this coupling to a minimum by choosing $\sigma = 0$.

Case 2 does not have either of the above faults and is considered to be the best choice. It does however require a slightly larger and better mirror because of the more oblique incidence.

As $m$ increases this objection becomes less serious.

With the arrangements described, tilt in the vertical plane gives a corresponding rotation of the image. As far as vibrations are concerned the effect is imperceptible and theoretically is zerio at the centre of the field of view.

It will usually be convenient to apply a weak constraint to the gyroscope spin axis such that it tends continually to return or precess to the central position. This permits the tracking of a moving target with a corresponding gyro lag and in one plane of movement image rotation will be nearly equal to the gyro lag angle. When stabilisation is by means of an inertial mass (which may be a non rotationg gyro-wheel) a weak centralising spring may be used.

For ground targets moving horizontally the orientation described gives no rotation, so is normally to be preferred. There is however rotation when tracking targets moving vertically, but as these are usually well above the horizon the lack of a background datum in practice conceals the rotation.

APPLICATION TO CINE-CAMERAS AND T.V. CAMERAS

In these instruments the real image is required to be stabilised with respect to the sensitive plate, i.e., with respect to the case of the instrument and not with respect to inertial space.

As may readily be seen from first principles, this is equivalent to putting $m = \infty$ in the previous analysis, and with this change equations (1) and (5) will be identified as (1') and (5').

The most probable geometry for such applications is a stabilised mirror in front of a standard instrument, being one of a pair of mirrors arranged as in a periscope.

With no lenses in front of the stabilised mirror we have the situation $f = \infty$, $\delta = 90°$, and from equations (1') and (5') we obtain $r = 2$ and $\sigma = 0$ as expected.

If it is required to avoid a lop-sided package the gyro unit must be above or below the camera and this implies image rotation when panning. It remains to be seen whether this is serious enough to forbid such shots.

It should be noted that image rotation can be reduced along with gyro lag by means of a stiffer constraint towards the central position. This however tends to couple the spin axis to the case motion, and degrades the stabilisation. An optimum rate of exchange must be struck between the two effects.

VARIATION OF ZOOM LENSES

With the arrangement described above for cine and T.V. cameras a zoom lens or any other device may be used behind the stabilizer.

In a telescope it is not considered feasible to adjust the geometry for correct stabilisation at all $m$. It would seem best to design near the top $m$-values and accept some degradation at lower values. There is little loss for, say, $m$ between 10 and 20.

INERTIAL COMPENSATION

It will be noted from FIG. 2 that even with the spin axis in the central position and with "straight" gimbals ($\sigma = 0$) the gyro is not completely free as it has to drive the mirror 15.

In other words when an angular acceleration is imposed on the case, the mirror is required to accelerate about half as much, and its inertia imposes a disturbing torque on the gyro via the link to the inner gimbal. It is possible in principle to achieve complete cancellation of this disturbing torque by means of a "flywheel" or additional component pivoted like the mirror on the outer gimbal but linked to the inner gimbal in the reverse sense.

Depending on its "gear ratio" and proportions it could be a much lighter component than the mirror. However, apart from the complication the associated increase in the outer gimbals moment of inertia is counter-productive and in practise it will be better to put more power into the gyro if the effect has to be reduced.

There is of course always a great incentive to keep the moment of inertia of the mirror as small as possible.

What is claimed is:

1. An optical viewing device having a line of sight and a parallel viewing direction and comprising
   a. an objective lens system having spaced lens elements,
   b. a mirror element located to reflect light passing along an optical path between the lens elements,
   c. stabilizing means having a frame, an outer gimbal pivotally carried by the frame and carrying the mirror to pivot about a first axis, an inner gimbal carried by the outer gimbal to pivot about a second axis substantially parallel to said first axis, and a body carried by the inner gimbal, said body tending to maintain an alignment in space parallel to the line of sight,
   d. a link between the mirror element and the inner gimbal such that their respective angular movements relative to the outer gimbal are in the ratio $1 : r$, the arrangement being such that $1 - (2/r) + (2s/fr) = 1/m$ where
   $s$ is the distance along the optical axis between the reflecting surface and that part of the objective lens system that lies in front of the reflecting surface;
   $f$ is the focal length of that part of the objective lens system that lies in front of the reflecting surface; and
   $m$ is the overall magnification of the complete optical system of the device;
whereby the image produced by the device is stabilized in space against vibration leading to movement of the device about an axis perpendicular to the line of sight.

2. An optical viewing device having a line of sight and a parallel viewing direction and comprising
   a. an objective lens system having spaced lens elements,
   b. a mirror element located to reflect light passing along an optical path between the lens elements,
   c. stabilizing means having a frame, an outer gimbal pivotally carried by the frame and carrying the mirror to pivot about a first axis, an inner gimbal carried by the outer gimbal to pivot about a second axis substantially parallel to said first axis, and a body carried by the inner gimbal, said body tending to maintain an alignment in space parallel to the line of sight,
   d. a link between the mirror element and the inner gimbal the arrangement being such that, $$\frac{s}{f} + \left(1- \frac{s}{f}\right) \left\{ 2\sin \frac{\sigma}{2} \sin\sigma \left[\cos \left(\frac{\delta}{2}-\sigma\right) - \tan\sigma\sin \left(\frac{\delta}{2}-\sigma\right)\right] + \cos\delta \right\} = \frac{1}{m}$$

where
   $s$ is the distance along the optical axis between the reflecting surface and that part of the objective lens system that lies in front of the reflecting surface,
   $f$ is the focal length of that part of the objective lens system that lies in front of the reflecting surface,
   $m$ is the overall magnification of the complete optical system of the device,
   $\delta$ is the deviation from a straight line of the optical axis by the reflecting surface with the gimbals in their undeflected positions,
   $\sigma$ is the angle of the axis of the outer gimbal relative to an axis perpendicular to the inner gimbal axis and to the optical axis in front of the reflecting surface with the gimbals undeflected,
whereby the image produced by the device is stabilized in space against vibration leading to movement of the device about an axis perpendicular to the line of sight.

3. An optical viewing device as claimed in claim 1, in which the arrangement is also such that $$\frac{s}{f} + \left(1- \frac{s}{f}\right) \left\{ 2\sin \frac{\delta}{2} \sin\sigma \left[\cos \left(\frac{\delta}{2}-\sigma\right) - \tan\sigma\sin \left(\frac{\delta}{2}-\sigma\right)\right] + \cos\delta \right\} = \frac{1}{m}$$

where
   $\delta$ is the deviation from a straight line of the optical axis by the reflecting surface with the gimbals in their undeflected positions;
   $\sigma$ is the angle of the axis of the outer gimbal relative to an axis perpendicular to the inner gimbal axis and to the optical axis in front of the reflecting surface with the gimbals undeflected;
whereby the image produced by the device is stabilized against vibration leading to movement of the device about two mutually perpendicular axes which are each perpendicular to the line of sight.

4. An optical viewing device as claimed in claim 3, in which $r = 2m/m-1$.

5. An optical viewing device as claimed in claim 1, in which $r = 2$.

6. An optical viewing device as claimed in claim 3, in which $$\sqrt{2}\sin\sigma \; \cos \; 45°-\sigma \; -\tan\sigma\sin \; 45-\sigma = \frac{1}{m.}$$

7. An optical viewing device as claimed in claim 3, in which $\cos \delta = 1/m$.

8. An optical viewing device as claimed in claim 3 in which $s/f = 1/m$.

9. An optical viewing device as claimed in claim 1, in which said body is the rotor of a gyroscope.

* * * * *